Oct. 12, 1954 W. A. CORNELL 2,691,729

ELECTRICAL CIRCUITS

Filed March 5, 1953 3 Sheets-Sheet 1

INVENTOR
W. A. CORNELL

BY [signature]

ATTORNEY

Oct. 12, 1954 W. A. CORNELL 2,691,729

ELECTRICAL CIRCUITS

Filed March 5, 1953 3 Sheets-Sheet 2

INVENTOR
W. A. CORNELL
BY James W. Falk
ATTORNEY

INVENTOR
W. A. CORNELL
BY James J. Falk
ATTORNEY

Patented Oct. 12, 1954 2,691,729

UNITED STATES PATENT OFFICE 2,691,729

ELECTRICAL CIRCUITS

Warren A. Cornell, Murray Hill, N. J., assignor to Bell Telephone Laboratories, Incorporated, New York, N. Y., a corporation of New York Application March 5, 1953, Serial No. 340,585

11 Claims. (Cl. 250—27)

This invention relates to electrical circuits utilizing a series of signal pulses of varying potentials and polarities and, more particularly, to such circuits wherein information may be indicated by various voltages on a large number of lines which are repeatedly scanned.

In various electrical and telephone systems, a plurality of conductors or lines are repeatedly scanned to enable a single apparatus or equipment to serve each of a plurality of lines. One type of scanning that has been employed is known as the capacity type line scanner and is described in application Serial No. 185,929, filed September 21, 1950, of N. D. Newby. With such a scanner capacitively coupled to the individual lines, it is advantageous to amplify the scanned pulses before utilizing them in the associated apparatus.

The information may be stored or indicated on the lines by various voltages. Thus, when the lines comprise one conductor of each trunk of a telephone system and are connected through a high resistance to separate line plates of the capacity type scanner, four different values of direct current voltage may be applied to the line plate via the trunk conductor to indicate the occurrence of trunk seizure in a distant office, a continuity check on the connection that is set up, an answer in a distant office, and a disconnect of either the called or calling parties. The four voltages used for signalling may be classified as high positive, low positive, high negative and low negative. The difference in amplitude between the high and low voltages of the same polarity is a matter of choice but a two-to-one ratio has been found suitable. For other applications additional signal indications may be desired by applying still further direct current voltages to the individual lines.

As there are thus advantageously two or more signal amplitudes for each polarity of the scanned pulse, it is necessary to know not only the amplitude and polarity of the output pulse of the scanner but also the direct current level of the output in order to determine what direct current voltage exists on that particular line. But because of the capacitive coupling between the line plate and the scanner electrode of the scanner and, again, between the scanner electrode and output terminal, in the type scanner disclosed in the above-mentioned Newby application, and because the scanner amplifier has a finite value of input resistance, there is a limitation on the low frequency response of the scanner viewed as a transmission network. Thus, the direct current level at the output of the amplifier will depend on the number of line plates energized and upon the polarity and magnitude of the energizing voltages. The direct current level will, therefore, tend to deviate from and about the desired norm so that, while pulse polarity may be readily recognized, the different amplitudes may not be accurately and positively determined.

It is an object of this invention to assure the proper direct current level for the amplified output of a capacity type scanner.

It is another object of this invention to assure the restoration of the direct current level of a series of pulses of varying polarities and amplitudes without mutilation or distortion of the pulses themselves.

It is a further object of this invention to provide that the drift of the direct current level of the scanner pulses between applications of the intermittent clamping pulses is small while at the same time enabling the clamping pulses to restore the desired direct current level within a very short time.

These and other objects of this invention are attained in one specific embodiment of this invention wherein the output pulses from a capacity type scanner are applied to a scanner amplifier and intermittent clamping pulses are applied to the last stage of amplification in the amplifier. Specifically, in this embodiment, the charge is changed on the coupling condenser attached to the control electrode of the last tube of the amplifier by application of the clamping voltages thereto. As the direct current voltage level may drift either positive or negative, both positive and negative going pulses are applied to alter the condenser charge. By applying the clamping voltages to the last stage of amplification rather than directly to the scanner output itself, a much larger clamping signal may be employed as the signal output from the scanner is very small. Further, by restoring the direct current level after amplification, the amplifier stages need not be direct current coupled in order to preserve the direct current level of the signal pulses. Advantageously, however, subsequent circuits concerned with recognition of the amplitude and polarity of the scanned pulses should be capable of preserving the direct current level that has been established in accordance with this invention.

In this specific embodiment, the clamping signals are applied once each pulse signal at the instant when there is no or substantially no output from the scanner to the amplifier, thereby avoiding mutilation or distortion of a signal pulse itself each time the direct current level of the signal pulses is restored. A synchronizing pulse is applied to the clamping circuit in synchronism with each pulse output from the scanner. An appropriate amount of delay is provided by the clamping circuit so that a clamping pulse is generated precisely at the instant that the scanner output is a minimum, i. e., in between scanner signal pulses. The clamping pulse thus generated is then applied to a pair of tubes which serve to bring its voltage level to the desired direct current voltage level, which in this specific embodiment is ground, and to provide also a pulse of opposite polarity so that both positive and negative going clamping pulses may be applied to the amplifier.

In this embodiment of this invention, these clamping pulses are applied to the scanner amplifier through a double element hot cathode clamping diode. The clamping pulses are applied to the cathode of one element and the anode of the other element and their respective cooperating electrodes are connected together and to the control grid of the last amplifier tube. By employing this double element clamping diode the resistance of the clamping circuit is small during the time the clamping pulse is applied and very high during the interval between clamping pulses. In order to restore the direct current level of the amplifier circuit, i. e., of the amplifier output signal pulses, the circuit including the coupling condenser connected to the control grid of the last amplifier stage must have two inconsistent time constants, one which is large to prevent the charge on the condenser from changing during the time interval between applications of the clamping signals and a second which is small to allow the charge to be sufficiently altered during the brief application of the clamping signal to re-establish the desired direct current voltage level. By utilizing a high resistance connected in series with the condenser and a diode which has a high resistance between clamping pulses and a low resistance during the presence of the clamping pulses, these requirements are met.

It is one feature of this invention that the direct current voltage level of a series of signal pulses of varying amplitudes and polarities be maintained by the intermittent application of positive and negative going clamping pulses.

It is another feature of this invention that clamping pulses be applied at the instant between signal pulses when there is no or substantially no signal voltage present.

It is a further feature of this invention that a clamping circuit receive a synchronizing pulse to synchronize the clamping pulses with the signal pulses of varying amplitudes and include a delay circuit arranged to delay the generation of the clamping pulses until the instant between signal pulses.

It is a still further feature of this invention that the clamping pulses be applied to the coupling condenser connected to the control electrode of the last stage of an amplifier to change the charge on that condenser and that the condenser be included in one circuit having a long time constant in the interval between clamping pulses and in a circuit having a short time constant during the occurrence of a pulse.

A further feature of this invention relates to the utilization of a diode in the clamping circuit between the generation of the clamping pulses and their application to the amplifier to connect a high resistance to the coupling condenser of the last stage of the amplifier during the interval between clamping pulses but a low resistance to the condenser during the occurrence of clamping pulses.

A complete understanding of this invention and of these and various other features thereof may be gained from consideration of the following detailed description and the accompanying drawing, in which.

Figure 1:
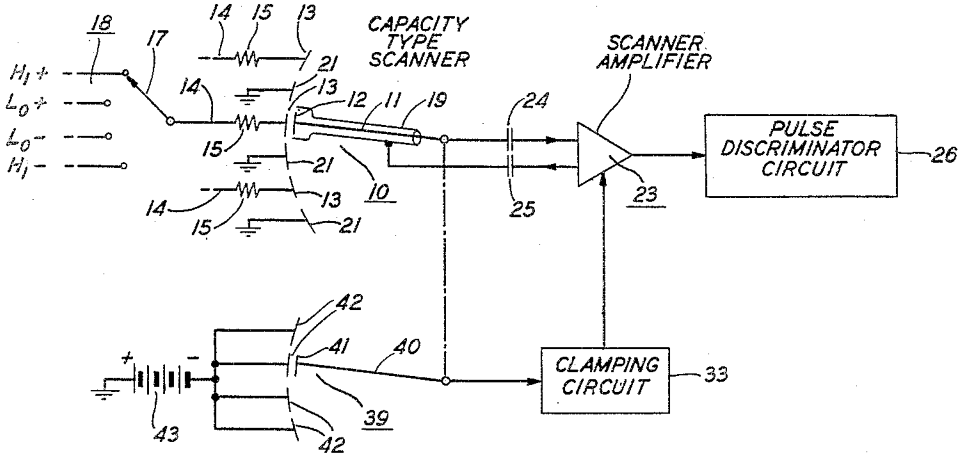
Fig. 1 is a block diagram representation of a capacity type scanner and clamping circuit in accordance with one specific illustrative embodiment of this invention.

Turning now to the drawing the specific embodiment illustrated in block schematic form in Fig. 1 may readily be employed in combination with a magnetic drum telephone system, as described in application Serial No. 340,471, filed March 5, 1953, by W. A. Malthaner and H. E. Vaughan, to provide information as to the condition of each of the lines or trunks of that system to the magnetic drum control circuits to enable them to take appropriate action in accordance with the signals that have been presented to the system and stored on the magnetic drums, as further set forth in that application. The embodiment advantageously comprises a capacity type scanner 10 having a rotating conductive arm 11 which is driven at a synchronous speed by a motor, not shown, and may advantageously be mounted on the same shaft as a magnetic drum and driven therewith when employed in a magnetic drum control system. The end of the conductive arm 11 may be considered to be an end plate 12 which passes in succession closely adjacent to each of a plurality of line plates 13. Each of the line plates 13 is connected, as by a resistance 15, to a line, conductor, trunk or terminal 14 to which various direct current signal voltages may be applied. This is represented in Fig. 1 by a switch 17 which may be connected to any one of a number of voltage sources 18, indicated as being high positive, low positive, low negative and high negative.

The rotating conductive arm 11 is encompassed by a shield 19 which rotates with the arm but is insulated therefrom. Shielding plates 21 are positioned between each of the line plates 13 and may be connected to ground, as shown, or to any desired common voltage. These shielding plates prevent interference between the adjacent line plates and also improve the response or output obtained from the rotating arm 11. As the rotating arm 11 approaches each line plate 13, it forms therewith a condenser and a voltage is induced on the end plate 12 of the rotating arm 11 in accordance with the particular voltage signal applied to the line plate 13. The rotating arm 11 is coupled to the scanner amplifier 23 by a coupling condenser 24. The amplifier serves to raise the signal level so that the signals may be subsequently employed and also to provide feedback to the scanner to improve the signal. This is accomplished by the shield 19 which is also capacitively coupled to the amplifier 23 through a condenser 25. This provides a feedback path to the shield 19 to increase its voltage as the voltage of the end plate 12 is increased and thereby reduce the shunt capacitance between the end plate 12 and the shield 19. In this manner, a greater portion of the signal voltage applied to the line plate 13 appears on the end plate 12 and less is lost through this shunt capacitance. The presence of the shield prevents the appearance of a large capacitance directly from the end plate 12 to ground and thus assures, together with the feedback path just referred to, that the greater portion of the signal voltage is applied to the scanner amplifier 23. Advantageously, the coupling condenser 24 is large with respect to the capacitance between the conductive arm 11 and the shield 19, while coupling condenser 25 is large with respect to the capacitance between the shield 19 and ground.

Figure 2:
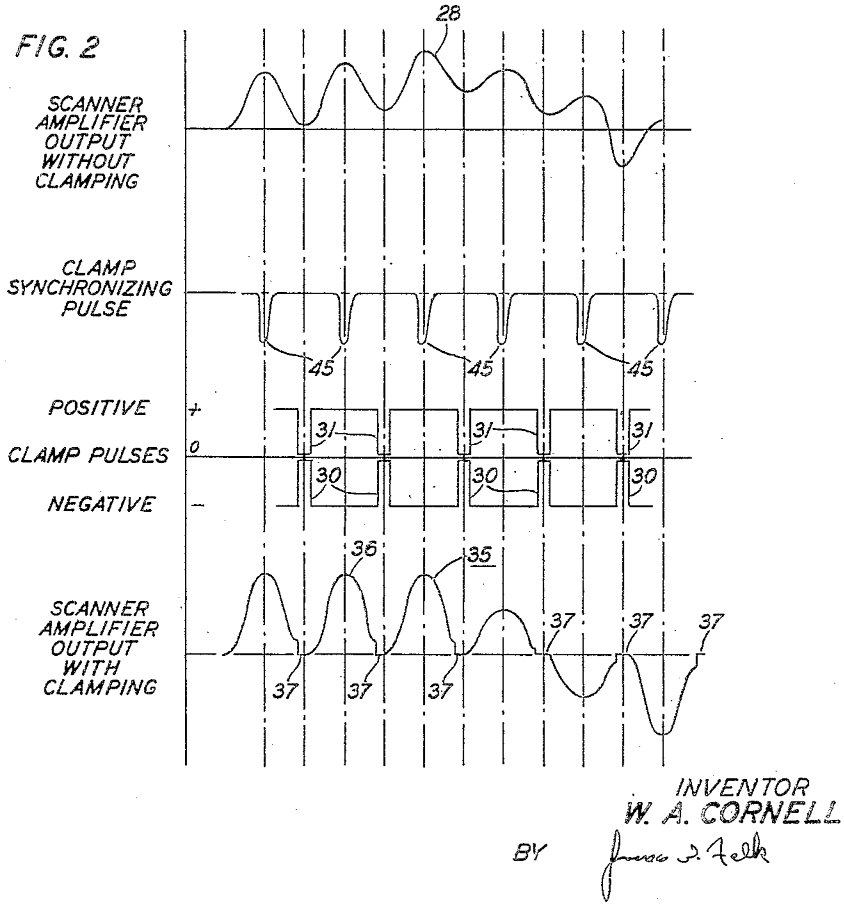
Fig. 2 is a plot of various scanner and clamp pulses against time.

The amplified signal pulses are applied from the scanner amplifier 23 to a pulse discriminator circuit 26 which differentiates between the various amplitude and polarity signals. Advantageously, the discriminator circuit may apply voltages to different output leads depending upon the amplified signal applied to it. Referring now to Fig. 2, curve 28 shows the scanner amplifier output without clamping plotted against time for a number of varying pulses. As can be seen, the direct current level tends to rise when the signal pulses are positive and to fall when the signal pulses are negative. In accordance with this invention, positive and negative going clamping pulses, indicated by the pulses 30 and 31 in Fig. 2 are applied to the amplifier 23 from a clamping circuit 33 at the instant and only at the instant when the signal pulses are a minimum, i. e., when there is or should be no signal pulse output from the scanner 10. Because of the application of these clamping pulses, in accordance with this invention, the scanner amplifier output comprises a series of pulses as shown by curve 35 of Fig. 2. As can be seen from that curve, the tendency of the positive pulses such as pulse 36 to cause the direct current level to rise or become positive is prevented by the clamping pulse which restores the voltage 37 between pulses to the proper direct current level. For this reason, there is a sharp drop or rise in each of the pulses of curve 35 during the presence of the clamping pulses 30 and 31.

As the clamping pulses are not applied continuously to the scanner amplifier 23, which would cause mutilation and distortion of the signal pulses themselves, but only during the brief interval between signal pulses, the clamping circuit 33 must be maintained in synchronism with the scanner 10. Turning now again to Fig. 1, in the illustrative embodiment there depicted, the required synchronism is provided by synchronizing pulses generated by a scanner 39 comprising a rotating arm 40 having an end plate 41 and a series of facing plates 42 each connected to a source of negative potential 43. The rotating arm 40 may be driven by the same shaft as the rotating arm 11 of the scanner 10. Various other means of providing the synchronizing pulses may, of course, be employed. Particularly when the scanner is employed with magnetic drum recorders, the synchronizing pulse may advantageously comprise information stored in a series of cells on the magnetic surface of the drum. Further, the pulses may be generated by a series of serrated edges or teeth of magnetic material passing under a magnetic reading head.

The synchronizing pulses 45 are indicated in Fig. 2. These pulses are generated at some time during the occurrence of the signal voltage pulses and may, as shown, be generated when those pulses are a maximum. The exact time of occurrence of the synchronizing pulses is not critical, as an appropriate amount of delay is incorporated in the clamping circuit so that the output of the clamping circuit, i. e., the clamping pulses 30 and 31, occurs during the absence of signal pulses. It is thus only necessary that the time of occurrence of the synchronizing pulses, their rate of repetition, the scanning rate, and the delay introduced in the clamping circuit be so arranged that the clamping pulses are applied to the amplifier 23 during the absence of signal pulses.

Figure 3:
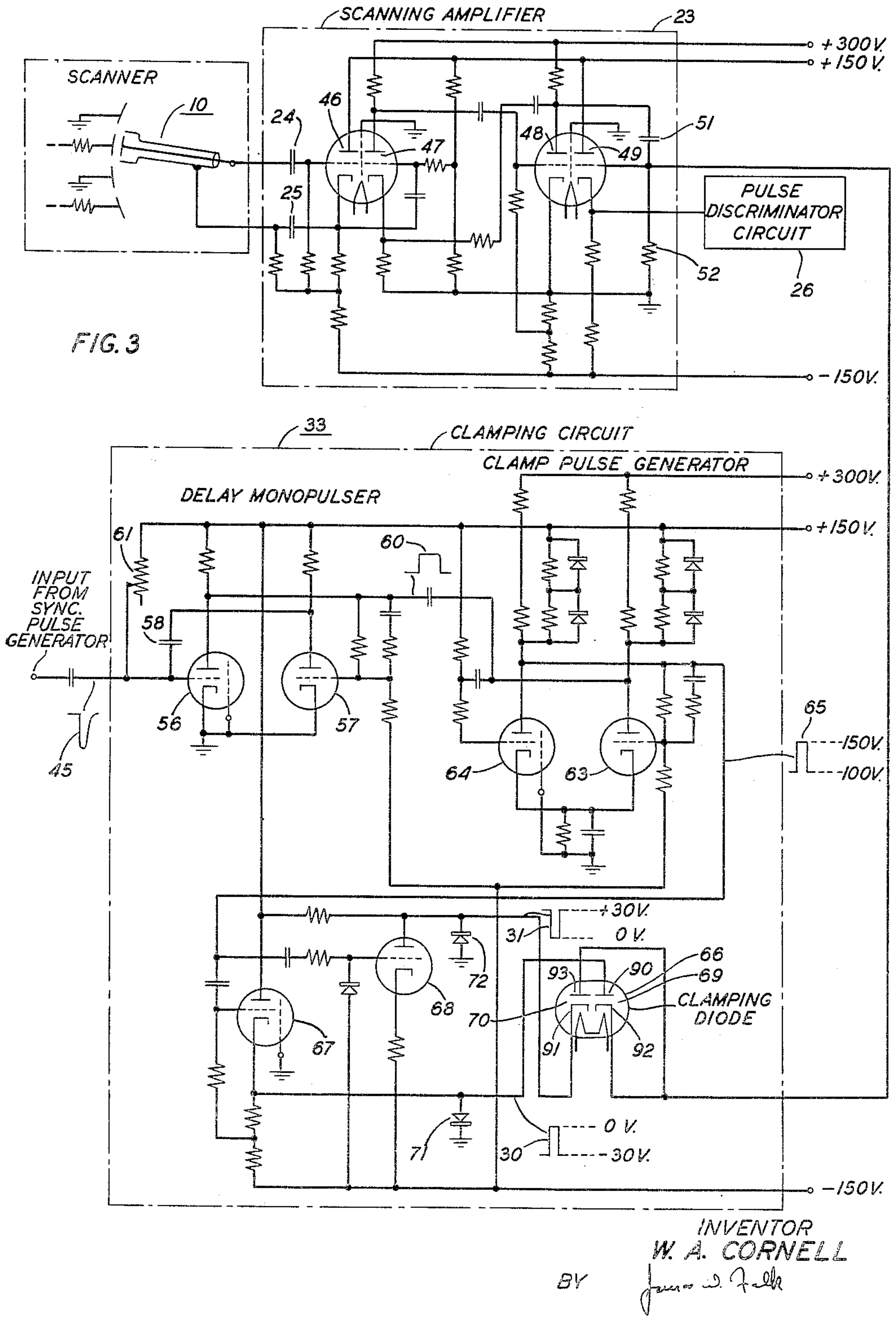
Fig. 3 is a schematic representation of the scanner amplifier and clamping circuits of the embodiment of Fig. 1.

Turning now to Fig. 3, there is depicted one specific illustrative circuit in accordance with the embodiment of Fig. 1. In this specific embodiment, the scanner 10 applies the signal pulses to the grid of a first tube 46 through the coupling capacitor 24. The scanner amplifier 23 comprises a four-stage amplifier having triodes 46, 47, 48 and 49, as is generally well known in the art. A voltage is fed back from the cathode of the first tube 46 to the shield 19 of the scanner through the coupling capacitor 25, as described above.

The intermittent clamping signals are applied to the grid of the last triode 49 of the amplifier circuit, and the clamped signal pulses are removed from the cathode of this last triode 49 and are applied to the pulse discriminator circuit 26. Referring again to Fig. 2, it is apparent from a consideration of curve 35 that the drift of the direct current level during any one pulse should be maintained reasonably small so that the correction that need be introduced by the clamping pulses is not too great. It is, therefore, desirable that the time constant of the R-C circuit coupled to the grid of the last tube 49, comprising the coupling condenser 51, the impedance looking back towards the preceding tube, and the resistor 52, be large. However, it is also desirable to be able to change the charge on condenser 51 quickly during the presence of the clamping pulses. A short time constant for the clamping R-C circuit is, therefore, desired. This circuit again includes the condenser 51, the impedance looking back to the preceding tube, and also the impedance of the clamping pulse source. These desirable conditions may advantageously be obtained by making resistor 52 large while utilizing a clamp circuit with a low impedance. These two time constants are related to each other in the operation of the circuit in that a large resistor 52 decreases the drift of the direct current load and, therefore, decreases also the amount of change of charge required during the short interval that the clamping pulses are applied, thereby allowing that time constant also to be larger. A satisfactory balance between these two constants can readily be designed by those skilled in the art.

Turning now to the clamping circuit itself, the synchronizing pulse 45 from the synchronizing pulse generator may advantageously be a negative pulse that is applied to the grid of the normally conducting triode 56 of the delay monopulser. The delay monopulser serves to delay the triggering of the clamp circuit until the instant when the signal pulse voltage applied to the scanner amplifier is a minimum, as discussed above. Application of the synchronizing pulse 45 inhibits conduction in triode 56 and allows conduction in triode 57 to commence, as is known in single shot multivibrator circuits. Triode 57 will remain conducting until condenser 58, connected between its plate and the grid of triode 56, builds up sufficient voltage again to allow conduction in triode 56. When conduction stops in triode 56, the voltage of its plate swings positive and remain positive until conduction again commences, at which time it returns to its original lower level. The output pulse 60 applied from the plate of triode 56 to the clamp pulse generator is, therefore, a positive pulse; and the duration of pulse 60 is governed by the time constant of the capacitor 58 and resistance 61 together with the impedance looking back towards the plate circuit of tube 57. By carefully predetermining this constant, and particularly the resistance 61, the duration of pulse 60 corresponds to the delay desired between the occurrences of the synchronizing pulse 45 and the clamping pulses 30 and 31.

The clamp pulse generator is also a single shot multivibrator circuit which operates on reception of the negative impulse at the end of the pulse 60; the initial positive swing of pulse 60 has no effect on the clamp pulse generator. The pulse 60 is applied to the grid of tube 64 allowing conduction to commence in that tube and inhibiting the conduction priorly present in the other tube 63 of the clamp pulse generator circuit. During the short time of conduction of tube 64, a short and accurately shaped pulse 65 is applied from the plate of tube 64 to a double element clamping diode 66 through a pair of triodes 67 and 68. Diode 66 is preferably of the hot cathode type. Each of tubes 67 and 68 changes the absolute voltage limits of the pulse 65 without changing its shape. Thus, the pulse 65 may advantageously be a 50-volt positive pulse occurring between +100 and +150 volts. In the specific illustrative embodiment depicted, however, the direct current level of the signal pulses that it is desired to maintain is ground. The pulse 65 is, therefore, applied to the grid of the cathode follower tube 67 causing that tube to conduct more heavily and thus raise the cathode potential. Originally, the cathode was at some negative potential, such as −30 volts; the rise above that potential is limited to ground potential by a varistor or diode 71. Thus, the voltage output from the cathode of tube 67 is a positive pulse 30 rising from some negative voltage to ground potential during the occurrence of the pulse 65. This is the positive clamping pulse and is applied to the plate 90 of element 69 of the double clamping diode 66.

Similarly, the pulse 65 is simultaneously applied to the grid of tube 68 causing it to conduct more heavily and thereby causing the voltage of its plate to drop from some positive potential, such as +30 volts. This drop is also limited to ground potential by a varistor or diode 72. The voltage output from the plate of tube 68 is, therefore, a negative pulse 31 dropping from some positive value to ground potential during the occurrence of pulse 65. Tube 68 thus also serves to reverse the polarity of the pulse 65. This pulse 31 is the negative clamping pulse and is applied to the cathode 91 of the other element 70 of the double clamping diode 66.

The double element clamping diode 66 is advantageously of the type that will conduct when there is practically no potential difference between the electrodes. Normally, the output of tube 68 applies a positive voltage to the cathode 91 of diode element 70, and the output of tube 67 applies a negative voltage to the anode 90 of the diode element 69. When the pulses 30 and 31 are applied to these electrodes, their potential is raised or dropped to ground potential. The cathode 92 and anode 93 opposite those electrodes to which the clamping pulses 30 and 31 are applied are connected together and through a common lead to the grid of the tube 49 in the last stage of the amplifier 23, i. e., to the output side of the coupling condenser 51. As pointed out above, the direct current level of the amplifier will tend to swing in the direction of the polarity of the last signal pulse. If a positive signal pulse is being amplified by amplifier 23, the direct current level of this point will have shifted sufficiently positive to cause element 70 of diode 66 to conduct, at which time plate 93 will be held at a potential no more than a few tenths of a volt positive with respect to ground. Similarly, if the last pulse had been negative, the potential of cathode 92 will be sufficiently negative to cause element 69 to conduct and raise the cathode potential to within a few tenths of a volt of ground potential.

An appreciation of the magnitude of the duration of the pulses and of the time constants involved can be gained from the fact that in one specific illustrative embodiment, the duration of the clamping pulses was of the order of 3 microseconds, and the interval between pulses was of the order of 17 microseconds.

Figure 4:
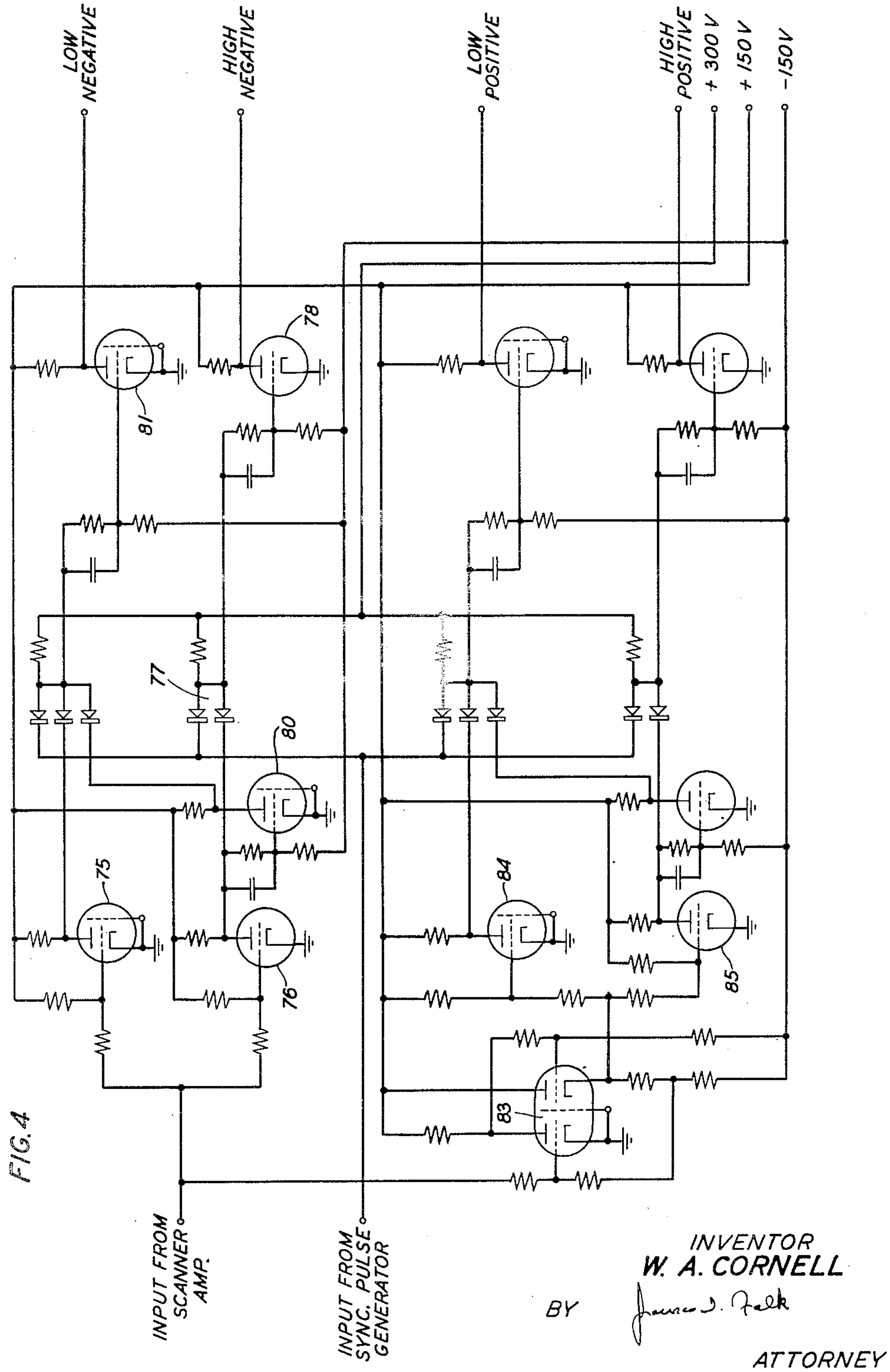
Fig. 4 is a schematic representation of a pulse discriminator circuit that may be employed in the embodiment of Fig. 1.

One pulse discriminator circuit that may readily be employed with the scanner, amplifier and clamping circuits in accordance with this invention is shown in Fig. 4. This circuit is limited to the recognition of each of four different scanner output pulses and provides an output signal of uniform amplitude, polarity and length at each of four separate output terminals, but this invention is, of course, not limited to any particular number of scanner pulses, as discussed further above. The clamped scanner pulses from the scanner amplifier 23 are applied to the grids of two normally conducting tubes. These grids are connected to a resistance summing circuit which combines the incoming signals with a fixed positive voltage so that tube 76 is cut off only by a high negative signal from the amplifier and tube 75 by both high and low negative pulses. When a high negative signal is applied, the positive going signal on the plate of tube 76 and a synchronizing pulse, which may be applied from the same synchronous pulse generator as utilized by the clamp circuit, are applied to the "and" circuit 77; and the resulting output pulse from this circuit is applied to the grid of an output tube 78, causing this tube to conduct and produce an output at its plate. The signal at the plate of tube 76 is also inverted by a tube 80 and combined in an "and" circuit with the synchronous pulse and the signal at the plate of tube 75. Since the signals at the plates of tubes 75 and 80 are of opposite polarity, they in effect cancel each other out, and no input signal is applied to the grid of tube 81. The employment of the synchronizing pulse in this circuit assures uniformity of output pulse duration and allows closer tolerances to be utilized in the pulses appearing at certain of the plates of tubes in the circuit.

When a low negative signal is applied to the input of the discriminator circuit, only tube 75 is cut off; and since no signal appears at the plate of tube 80 to cancel the signal at the plate of tube 75, this latter signal is combined with the synchronizing pulse to cause tube 81 to conduct and produce an output at its plate.

In order to provide for positive scanner pulses from the scanner amplifier 23, a unity gain phase inverter tube 83 is employed to apply pulses to two normally conducting tubes 84 and 85 which cooperate in a circuit identical to the circuit described above with reference to the negative pulses.

It is to be understood that the above-described arrangements are illustrative of the application of the principles of the invention. Numerous other arrangements may be devised by those skilled in the art without departing from the spirit and scope of the invention.

What is claimed is:

1. In combination, an amplifier circuit, means for applying a series of signal pulses of varying amplitudes and polarities to said amplifier circuit, and means for maintaining the direct current voltage level of said signal pulses substantially constant, said last-mentioned means comprising means for generating positive and negative going clamping pulses, means for limiting said clamping pulses to said voltage level, and means for applying said clamping pulses to said amplifier circuit during the interval between said signal pulses.

2. In the combination of claim 1, said last-mentioned means comprising a first diode element, means for applying said positive going pulse to the anode of said first diode element, a second diode element, means for applying said negative going pulse to the cathode of said second diode element, and means connecting the cathode and anode cooperating therewith together and to said amplifier circuit.

3. An electrical circuit comprising a plurality of lines, means for scanning each of said lines and producing a series of signal pulses depending on the voltage applied to said lines, said means including a capacity type scanner, means for amplifying said signal pulses, and means for restoring the direct current voltage level of said signal pulses comprising means for applying clamping pulses to said amplifier means during the instant when substantially no signal voltages are present therein.

4. An electrical circuit comprising means for producing a series of signal pulses of varying amplitudes, means for amplifying said signal pulses, and means for maintaining the direct current voltage level of said signal pulses constant, said last-mentioned means comprising a pulse generator, means for generating a synchronizing pulse, means for delaying said synchronizing pulse and applying said synchronizing pulse to said pulse generator so that said pulse generator generates a pulse only during the interval between said signal pulses, means for limiting said generated pulses to the direct current voltage level to be maintained, and means for applying said generated pulses to said amplifying means.

5. An electrical circuit comprising means for producing a series of signal pulses of varying amplitudes, means for amplifying said signal pulses, and means for maintaining the direct current voltage level of said signal pulses constant, said last-mentioned means comprising means for generating positive and negative going clamping pulses occurring during the intervals between said signal pulses, means for limiting said clamping pulses to said voltage level, and means including diode means for applying said clamping pulses to said amplifying means.

6. An electrical circuit comprising means for producing a series of signal pulses of varying amplitudes, means for amplifying said signal pulses, said amplifying means comprising at least one electron discharge device and a condenser connected to the control electrode thereof, and means for maintaining the direct current voltage level of said signal pulses constant, said last-mentioned means comprising means for generating short clamping pulses only during the intervals between said signal pulses, means for limiting said clamping pulses to said voltage level, and means applying said clamping pulses to said condenser, said last-mentioned means comprising a diode element having one electrode thereof connected to said condenser and the other electrode thereof connected to said limiting means.

7. An electrical circuit comprising a plurality of lines, means for scanning each of said lines and producing a series of signal pulses of varying amplitudes depending on the voltage applied to said lines, said means including a capacity type scanner, means for amplifying said signal pulses, said amplifying means including at least one electron discharge device and a condenser connected to the control electrode thereof, and means for maintaining the direct current voltage level of said signal pulses substantially constant, said last-mentioned means comprising means for generating short pulses only during the intervals between said signal pulses, diode means comprising a pair of cooperating anodes and cathodes, means for deriving a positive and a negative going clamping pulse from each one of said generated pulses, means for limiting said clamping pulses to the direct current voltage level to be maintained, means for applying said positive going clamping pulse to the anode of one of said pairs and said negative going pulse to the cathode of the other of said pairs, and means connecting said cathode and anode cooperating therewith together and to said condenser.

8. An electrical circuit comprising means for producing a series of signal pulses of varying amplitudes, means for amplifying said signal pulses, said amplifying means comprising at least one electron discharge device and a condenser connected to the control electrode thereof, and means for maintaining the direct current voltage level of said signal pulses constant, said last-mentioned means comprising means for generating short pulses, means for generating synchronizing pulses, means for delaying said synchronizing pulses and applying said synchronizing pulses to said generating means such that a pulse is generated by said generating means only during the interval between said signal pulses, means for deriving clamp pulses from said generated pulse limited to the direct current voltage level to be maintained, and means applying said clamp pulses to said condenser, said last-mentioned means having a high resistance during the interval between clamp pulses and a low resistance during the occurrence of said clamp pulses.

9. An electrical circuit in accordance with claim 8 wherein said last-mentioned means comprises a diode element having one electrode thereof connected to said condenser and the other electrode thereof connected to said deriving means.

10. An electrical circuit comprising a plurality of lines, means for scanning each of said lines and producing a series of signal pulses of varying amplitudes and polarities depending on the voltage applied to said lines, said means including a capacity type scanner, means for amplifying said signal pulses, said amplifying means comprising a plurality of amplifier stages and a condenser connected to the control electrode of the electron discharge device of the last stage, and means for maintaining the direct current voltage level of said signal pulses constant, said last-mentioned means comprising a pulse generator, means for generating a synchronizing pulse, means for delaying said synchronizing pulse and applying said synchronizing pulse to said pulse generator so that said pulse generator generates a pulse only during the interval between said signal pulses, diode means, means for deriving a positive and a negative going clamping pulse from said generated pulse, limiting said clamping pulses to the direct current voltage level to be maintained, and applying said clamping pulses to said diode means, and means connecting said diode means to said condenser.

11. An electrical circuit in accordance with claim 7 wherein said diode means comprises a pair of cooperating anodes and cathodes, said positive going clamp pulse is applied to the anode of one of said pairs, said negative going clamp pulse is applied to the cathode of the other of said pairs, and said cathode and anode cooperating therewith are connected together and to said condenser.

References Cited in the file of this patent

UNITED STATES PATENTS

| Number | Name | Date |
|---|---|---|
| 2,578,268 | Sherwin | Dec. 11, 1951 |